US008274863B2

(12) United States Patent
Ihashi et al.

(10) Patent No.: US 8,274,863 B2
(45) Date of Patent: Sep. 25, 2012

(54) CHRONOGRAPH TIMEPIECE

(75) Inventors: Tomohiro Ihashi, Chiba (JP); Kenji Ogasawara, Chiba (JP); Kazuo Kato, Chiba (JP); Kazumi Sakumoto, Chiba (JP); Hiroshi Shimizu, Chiba (JP); Akira Takakura, Chiba (JP); Eriko Noguchi, Chiba (JP); Takanori Hasegawa, Chiba (JP); Keishi Honmura, Chiba (JP); Saburo Manaka, Chiba (JP); Kosuke Yamamoto, Chiba (JP)

(73) Assignee: Seiko Instruments Inc. (JP)

( * ) Notice: Subject to any disclaimer, the term of this patent is extended or adjusted under 35 U.S.C. 154(b) by 233 days.

(21) Appl. No.: 12/804,502

(22) Filed: Jul. 22, 2010

(65) Prior Publication Data

US 2011/0026370 A1 Feb. 3, 2011

(30) Foreign Application Priority Data

Jul. 23, 2009 (JP) ................................. 2009-172512

(51) Int. Cl.
*G04F 8/00* (2006.01)
*G04B 1/00* (2006.01)
*H02J 7/00* (2006.01)

(52) U.S. Cl. ......................... 368/107; 368/204; 320/135

(58) Field of Classification Search .................... 368/64, 368/66, 204; 320/135, 136
See application file for complete search history.

(56) References Cited

U.S. PATENT DOCUMENTS

| | | | | |
|---|---|---|---|---|
| 4,041,691 | A * | 8/1977 | Chihara et al. | 368/66 |
| 4,240,021 | A * | 12/1980 | Kashima et al. | 320/101 |
| 5,289,452 | A | 2/1994 | Sakamoto et al. | 368/73 |
| 6,898,156 | B1 * | 5/2005 | Nakamiya et al. | 368/204 |
| 7,876,070 | B2 * | 1/2011 | Kitahara | 320/134 |

* cited by examiner

*Primary Examiner* — Vit W Miska
(74) *Attorney, Agent, or Firm* — Adams & Wilks

(57) ABSTRACT

Disclosed is a chronograph timepiece in which it is possible to prevent the battery reliability service life time from being exceeded even when the period of time that the chronograph function is used is short, making it possible to prevent failure generation in the chronograph timepiece due to liquid leakage. A 24-hour counter down-counts a period of time that has elapsed starting from 24 hours, and a chronograph counter down-counts the period of time that chronograph measurement operation is performed from a predetermined time; when the count values of the 24-hour counter and the chronograph counter become equal to each other, a processing unit consumes a battery for the residual period of time of the two counters by a battery power consuming unit.

20 Claims, 6 Drawing Sheets

CHRONOGRAPH TIMEPIECE

BACKGROUND OF THE INVENTION

1. Field of the Invention

The present invention relates to a chronograph timepiece having a time indicating function and a time measuring function.

2. Description of the Related Art

There has been developed a multi-function timepiece in which a plurality of drive motors are mounted in order to individually drive a plurality of indicator hands and which is endowed with a time information indicating function as the basic function and, further, with a chronograph measuring function for performing time measurement (e.g., see Japanese Patent No. 3,019,324).

As a drive power source for the electrical components such as the motors, a battery is mounted in the above multi-function timepiece, and, in determining the battery service life, it is common practice to perform calculation based on an operational current value and a battery capacitance value. In the case of a chronograph timepiece, it is common practice to calculate the battery service life on the assumption that the requisite power consumption for the time indicating operation corresponds to 24 hours per day and that the requisite power consumption for the chronograph measurement operation corresponds to one hour per day.

However, the drive pulses for the chronograph hand movement motor are of high frequency, so that, in many cases, there are used drive pulses of higher power effective value than the drive pulses for the time hand movement motor. Thus, the chronograph function consumes the power of the battery in large proportion; in a case in which the chronograph timepiece is put to daily use without much utilizing the chronograph function, the time portion causing shortage of use of the chronograph operation during a predetermined period of time serving as a condition for battery service life calculation will constitute a use-shortage period; due to the influence of this use-shortage period, the battery consumption becomes too small, and the battery service life becomes excessively long, with the result that the reliability service life of the battery is exceeded to generate liquid leakage, thereby causing a serious damage to the chronograph timepiece.

SUMMARY OF THE INVENTION

It is an aspect of the present invention to prevent the battery reliability service life time from being exceeded even when the period of time that the chronograph function is used is short, thereby preventing generation of failure in the chronograph timepiece due to liquid leakage.

According to the present invention, there is provided a chronograph timepiece including: a timekeeping unit effecting timekeeping and time display; a chronograph unit effecting time measurement and measurement result display; and a battery serving as a drive power source, wherein there is provided a consumption control unit calculating a use-shortage period of the chronograph unit during a predetermined period of time and consuming the battery by an amount corresponding to the use-shortage period.

In the chronograph timepiece of the present invention, it is possible to prevent the battery reliability service life time from being exceeded even when the period of time that the chronograph function is used is short, making it possible to prevent generation of failure in the chronograph timepiece due to liquid leakage.

DETAILED DESCRIPTION OF THE PREFERRED EMBODIMENTS

Figure 1:
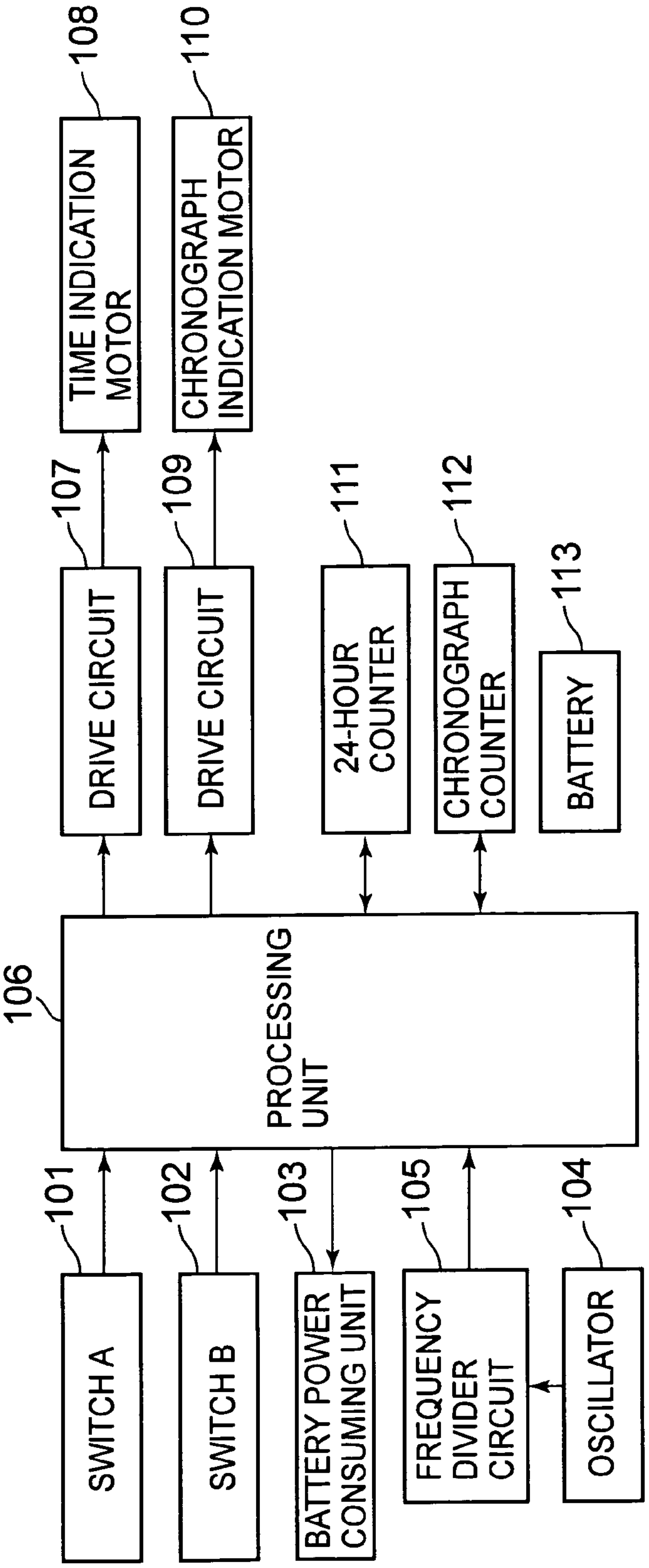
FIG. 1 is a block diagram showing a chronograph timepiece according to a first embodiment of the present invention.

FIG. 1 is a block diagram showing a chronograph timepiece according to the first embodiment of the present invention.

In FIG. 1, the chronograph timepiece is equipped with: a switch A 101 for performing a chronograph function starting operation; a switch B 102 for performing a chronograph function stopping operation and a chronograph function resetting operation; a battery power consuming unit 103 consisting of a resistance, for example, consuming a battery 113 serving as a drive power source; an oscillator 104 generating a signal of a predetermined frequency; a frequency divider circuit 105 effecting frequency division on the signal generated by the oscillator 104 to generate a timepiece signal serving as a timekeeping reference; and a processing unit 106 consisting of a central processing unit (CPU) and performing various kinds of processing operations such as controlling the various electrical components constituting the chronograph timepiece such as motors 108 and 110.

Further, the chronograph timepiece is equipped with: a drive circuit 107 rotating a time indication motor 108 by a drive pulse corresponding to a control signal from the processing unit 106; the time indication motor 108 rotating time hands (e.g., an hour hand, minute hand, and second hand (not shown)); a drive circuit 109 rotating the chronograph indication motor 110 with a drive pulse corresponding to a control signal from the processing unit 106; and the chronograph indication motor 110 rotating chronograph hands (e.g., a chronograph minute hand, and chronograph second hand (not shown)).

Further, the chronograph timepiece is equipped with: a 24-hour counter 111 consisting of a down counter and down-counting time that has elapsed starting from 24 hours (one day) constituting a predetermined unit time through control of the processing unit 106; a chronograph counter 112 consisting of a down counter and down-counting the time that a battery 113 is consumed by the battery power consuming unit 103 and the time that chronograph measurement is performed from a predetermined time (requisite time of use which is, for example, 1 hour) through controlling of the processing unit 106; and the battery 113 serving as a power source supplying drive power to the above electrical components 101 through 112.

Here, the switch A 101 and the switch B 102 constitute an operating unit. The oscillator 104, the frequency divider circuit 105, the processing unit 106, the drive circuit 107, and the time indication motor 108 constitute a timekeeping unit performing timekeeping and time display. The oscillator 104, the frequency divider circuit 105, the processing unit 106, the drive circuit 109, and the chronograph indication motor 110 constitute a chronograph unit performing time measurement and measurement result display. The battery power consuming unit 103, the processing unit 106, the 24-hour counter 111, and the chronograph counter 112 constitute a consumption control unit. The processing unit 106, the 24-hour counter 111, and the chronograph counter 112 constitute a use-shortage period calculating unit. The 24-hour counter 111 and the chronograph counter 112 respectively constitute a first counter unit and a second counter unit. The drive circuits 107 and 109 constitute a motor drive unit.

The consumption control unit can calculate a use-shortage period of the chronograph unit during a predetermined period of time and consume the battery 113 by an amount corresponding to the use-shortage period.

The consumption control unit has a use-shortage period calculating unit for calculating a use-shortage period of the chronograph unit during a predetermined period of time and can effect consumption by an amount corresponding to the use-shortage period calculated by the use-shortage period calculating unit.

The use-shortage period calculating unit may have a first down counter unit measuring the predetermined period of time and a second down counter unit measuring the use-shortage period, and can effect control so as to cause the consumption control unit to consume when the count values of the first and second down counter values become equal to each other.

The consumption control unit can interrupt consumption operation when the chronograph unit operates while the battery is being consumed.

Figure 2:
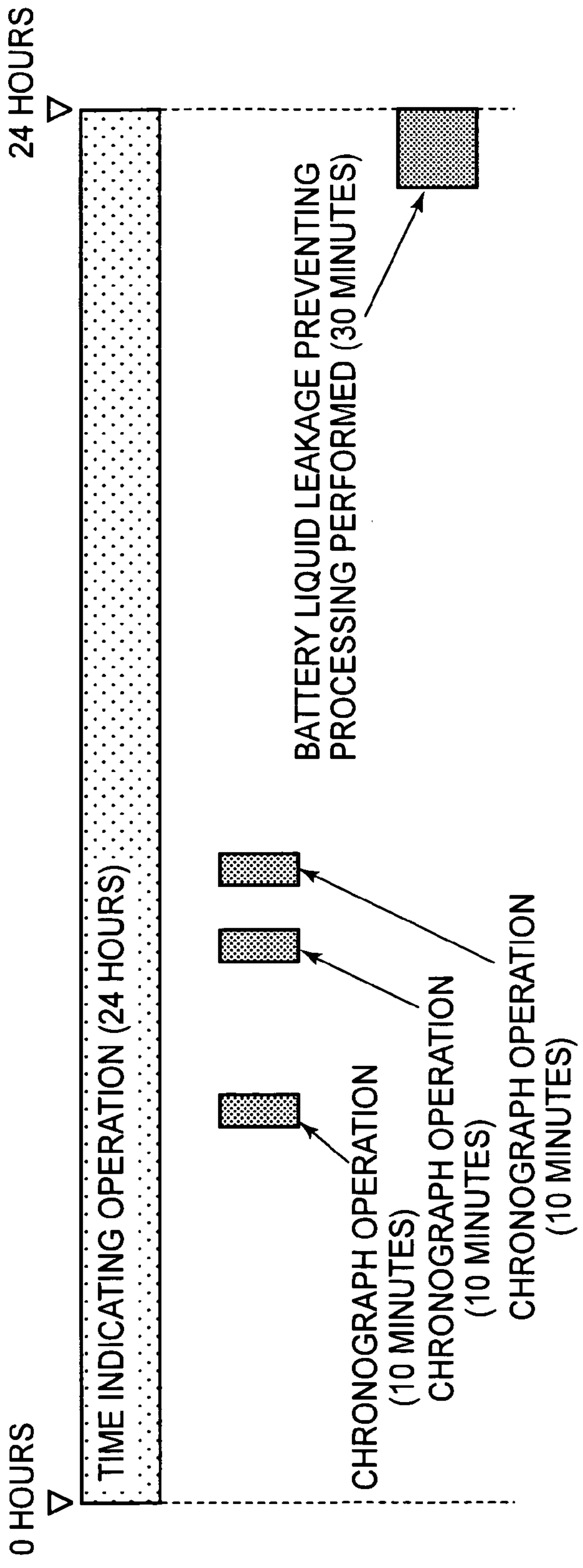
FIG. 2 is an explanatory view illustrating an operation common to the chronograph timepieces of the embodiments of the present invention.

FIG. 2 is an explanatory view schematically illustrating the operation of the first embodiment and that of the second embodiment of the present invention described below.

The operation of the embodiments of the present invention will be schematically described with reference to FIG. 2; in the chronograph timepiece, it is supposed that the service life of the battery 113 is determined on the assumption that chronograph measurement operation (chronograph operation) to effect time measurement for a predetermined requisite period of time (the requisite time of use which, in the example of FIG. 2, is 1 hour) during a predetermined unit time (which, in FIG. 2, is 24 hours, i.e., from 0 o'clock to 24 o'clock).

During the period of 24 hours, chronograph operation is conducted three times, for 10 minutes at each time; i.e., the time of use of the chronograph measurement function is 30 minutes in total. Since the requisite time of use is 1 hour, a battery liquid leakage preventing processing to consume the same power as that at the time of execution of chronograph measurement function is conducted for a use-shortage period of 30 minutes, which is the difference therebetween, thereby consuming the battery 113. In this way, the use-shortage period of the chronograph measurement function per day is measured, and the battery power is consumed by an amount corresponding to a predetermined chronograph measurement operation power once a day according to the chronograph measurement function use-shortage period. As a result, battery consumption is effected in an amount equivalent to that when chronograph measurement operation is conducted for the requisite time of use during the predetermined unit time, whereby it is possible to prevent the battery life from being unnecessarily elongated, making it possible to attain a battery service life coinciding with the nominal value.

Figure 3:
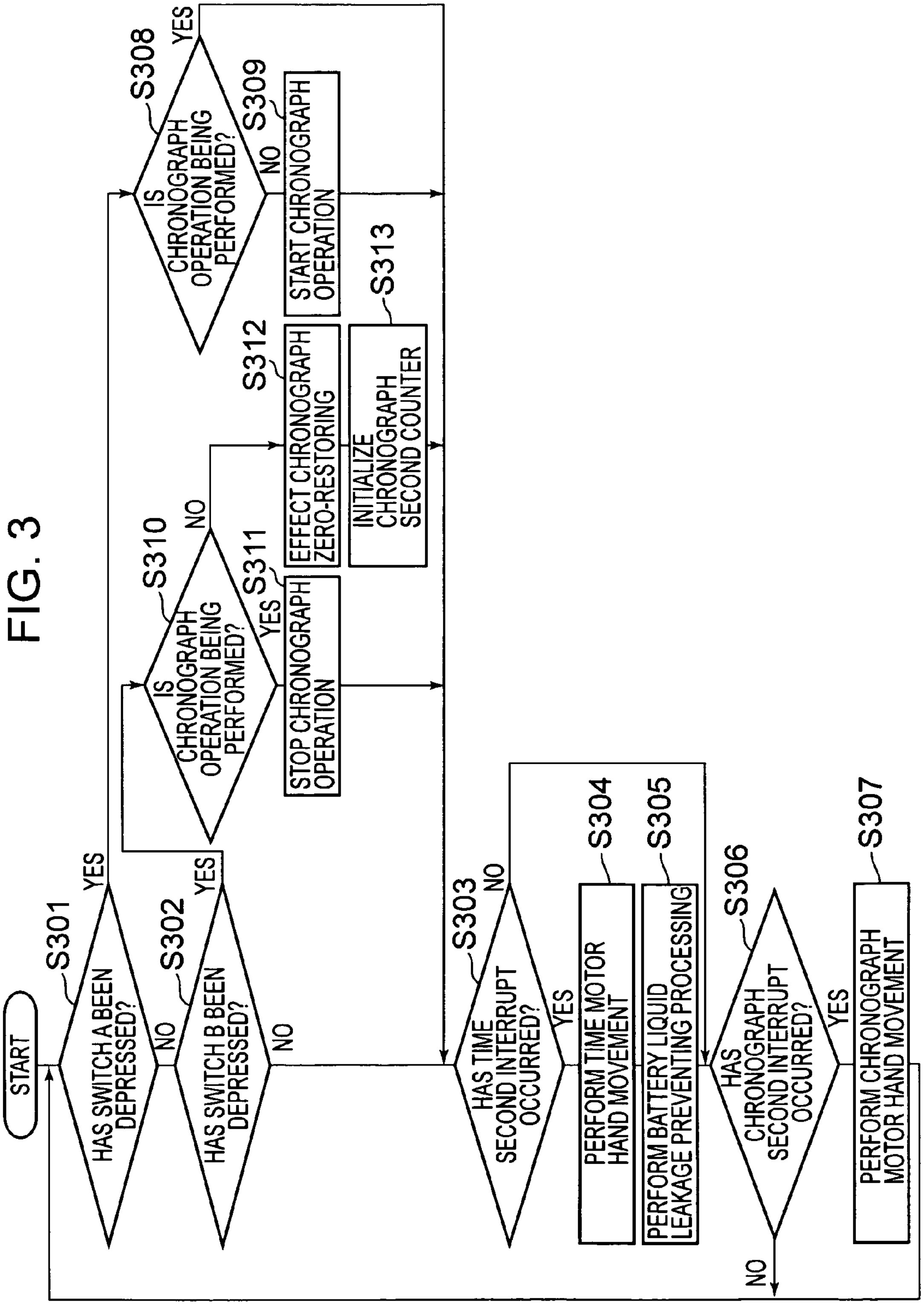
FIG. 3 is a flowchart common to the chronograph timepieces of the embodiments of the present invention.

FIG. 3 is a flowchart common to the chronograph timepieces of the embodiments of the present invention.

Figure 4:
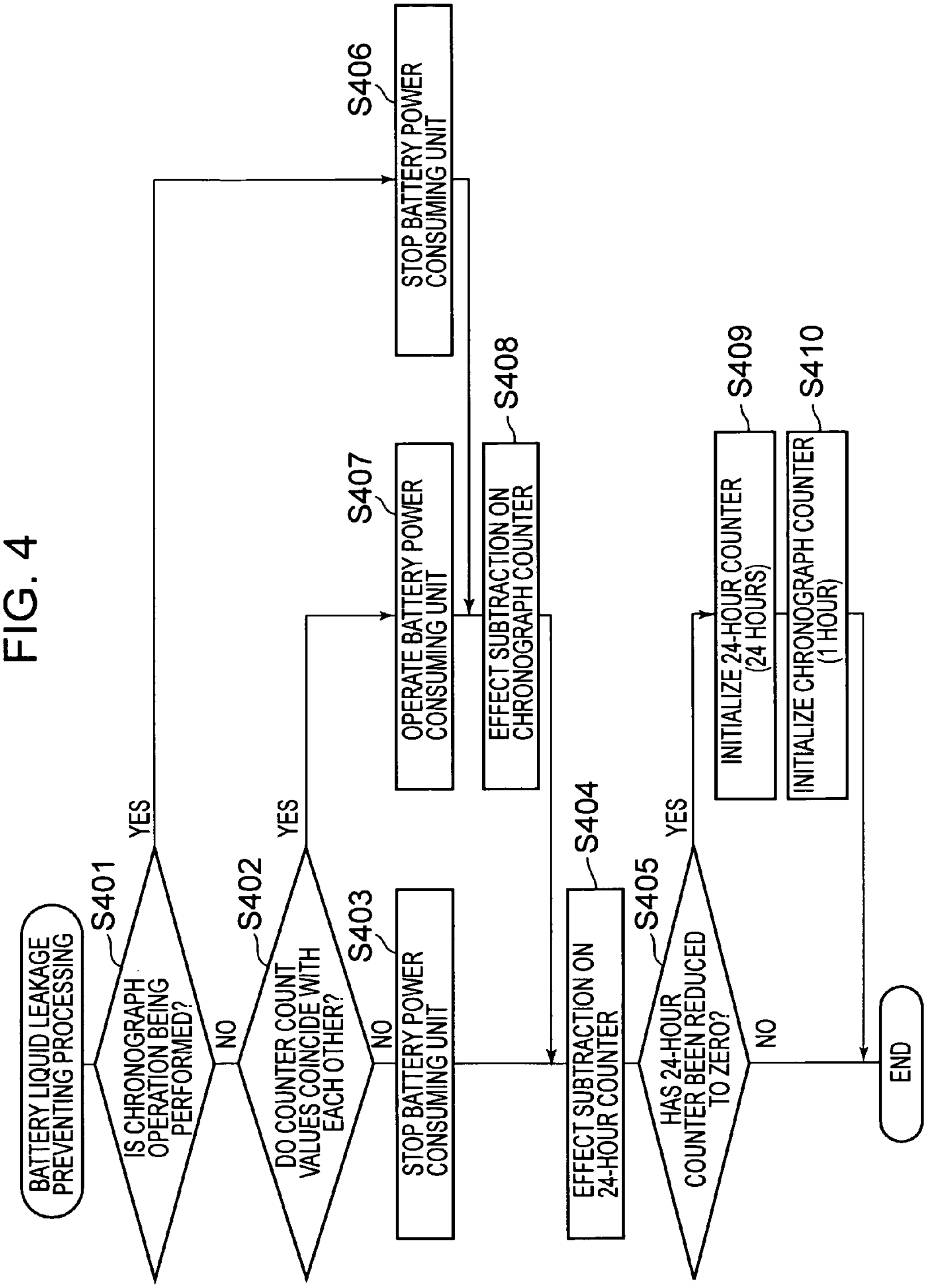
FIG. 4 is a flowchart for the chronograph timepiece of the first embodiment of the present invention.

FIG. 4 is a flowchart for the chronograph timepiece of the first embodiment of the present invention.

In the following, the operation of the first embodiment of the present invention will be described with reference to FIGS. 1 through 4.

When it is judged that the switch A 101 has been operated (step S301), the processing unit 106 advances to step S303 after starting chronograph measurement operation when no chronograph measurement is being currently conducted; when it is judged that chronograph measurement operation is being currently conducted, the processing unit immediately advances to step S303 (steps S308 and S309).

In the case in which it is judged in step S301 that the switch A 101 has not been operated, when it is judged that the switch B 102 has been operated (step S302), the processing unit 106 zero-restores the chronograph hands (not shown) (step S312) when no chronograph measurement operation is not being currently conducted (step S310), and initializes a chronograph second counter (not shown) for measuring chronograph seconds to advance to step S303 (step S313). When it is judged in step S310 that chronograph measurement operation is being currently performed, the processing unit 106 stops the chronograph measurement operation, and advances to step S303 (step S311). When it is judged in step S302 that the switch B 102 has not been performed, the processing unit 106 immediately advances to step S303.

When it is judged in step S303 that one second has elapsed in timekeeping (i.e., time second interrupt has occurred), the processing unit 106 controls the drive circuit 107 to drive the time indication motor 108 by one second (step S304), and performs a battery leakage preventing processing shown in FIG. 4 (step S305) before making a judgment as to whether or not one second has elapsed in chronograph measurement (i.e., whether or not chronograph second interrupt has occurred) (step S306).

When it is judged in step S303 that no time second interrupt has occurred, the processing unit 106 immediately advances to step S306 to make a judgment as to whether or not chronograph second interrupt has occurred. When it is judged in step S306 that chronograph second interrupt has occurred, the processing unit 106 controls the drive circuit 109 to thereby drive the chronograph indication motor 110 to move the chronograph hands (not shown) (step S307); then, the procedure returns to step S301, and when it is judged in step S306 that no chronograph second interrupt has occurred, the procedure immediately returns to step S301.

Next, the battery liquid leakage preventing processing in step S305 will be described with reference to FIG. 4; first, the processing unit 106 makes a judgment as to whether or not chronograph measurement operation is being conducted (step S401); when chronograph measurement operation is being performed, the battery consuming operation by the battery consuming unit 103 is stopped (step S406), and subtraction is effected on the count value of the chronograph counter 112 (step S408); then, the procedure advances to step S404 to perform a one-second subtraction processing on the count value of the 24-hour counter 111. When the chronograph measurement operation is started while the battery consuming operation by the battery power consuming unit 103 is being thus performed, the consuming operation by the battery power consuming unit 103 is interrupted.

In the case in which it is judged in step S401 that no chronograph measurement operation is being performed, when it is judged that the count value of the 24-hour counter 111 and that of the chronograph counter 112 are equal to each other (step S402), the processing unit 106 performs the battery consuming operation by the battery power consuming unit 103 (step S407), and one second is subtracted from the count value of the chronograph counter 112 (step S408), and then the procedure advances to step S404.

When it is judged in step S402 that the count value of the 24-hour counter 111 and that of the chronograph counter 112 are not equal to other, the processing unit 106 stops the consuming operation by the battery power consuming unit 103 (step S403), and one second is subtracted from the count value of the 24-hour counter 111 (step S404).

When, after the one-second subtraction processing of the count value of the 24-hour counter 111 in the processing step S404, it is judged that the count value of the 24-hour counter 111 has been reduced to zero (step S405), the processing unit 106 initializes the 24-hour counter 111, and sets the count value thereof to 24 hours (step S409), initializing the chronograph counter 112 to set the count value thereof to 1 hour before completing the processing (step S410). When it is judged in step S405 that the count value of the 24-hour counter 111 is not zero, the processing unit 106 completes the processing. After the completion of the battery liquid leakage preventing processing, the processing unit 106 advances to step S306 of FIG. 3.

In this way, the chronograph timepiece of the first embodiment of the present invention is equipped with a consumption control unit which calculates a use-shortage period of the chronograph unit during a predetermined period of time, and consumes the battery 113 by an amount corresponding to the use-shortage period. That is, the 24-hour counter 111 down-counts the time that has elapsed starting from 24 hours, and the chronograph counter 112 down-counts the time that chronograph measurement operation is performed from a predetermined period (requisite time of use); in the processing unit 106, when the count value of the 24-hour counter 111 and that of the chronograph counter 112 become equal to each other, the battery 113 is consumed for the residual period of time (the use-shortage period) of the counters 111 and 112 by the battery power consuming unit 103. Further, when the chronograph function is used during the operation of the battery power consuming unit 103, the operation of the battery power consuming unit 103 is stopped. Thus, even when the use period of time of the chronograph function is short or when it is not used at all, it is possible to prevent the battery reliability service life time from being exceeded, thus preventing failure generation in the chronograph timepiece due to liquid leakage.

Figure 5:
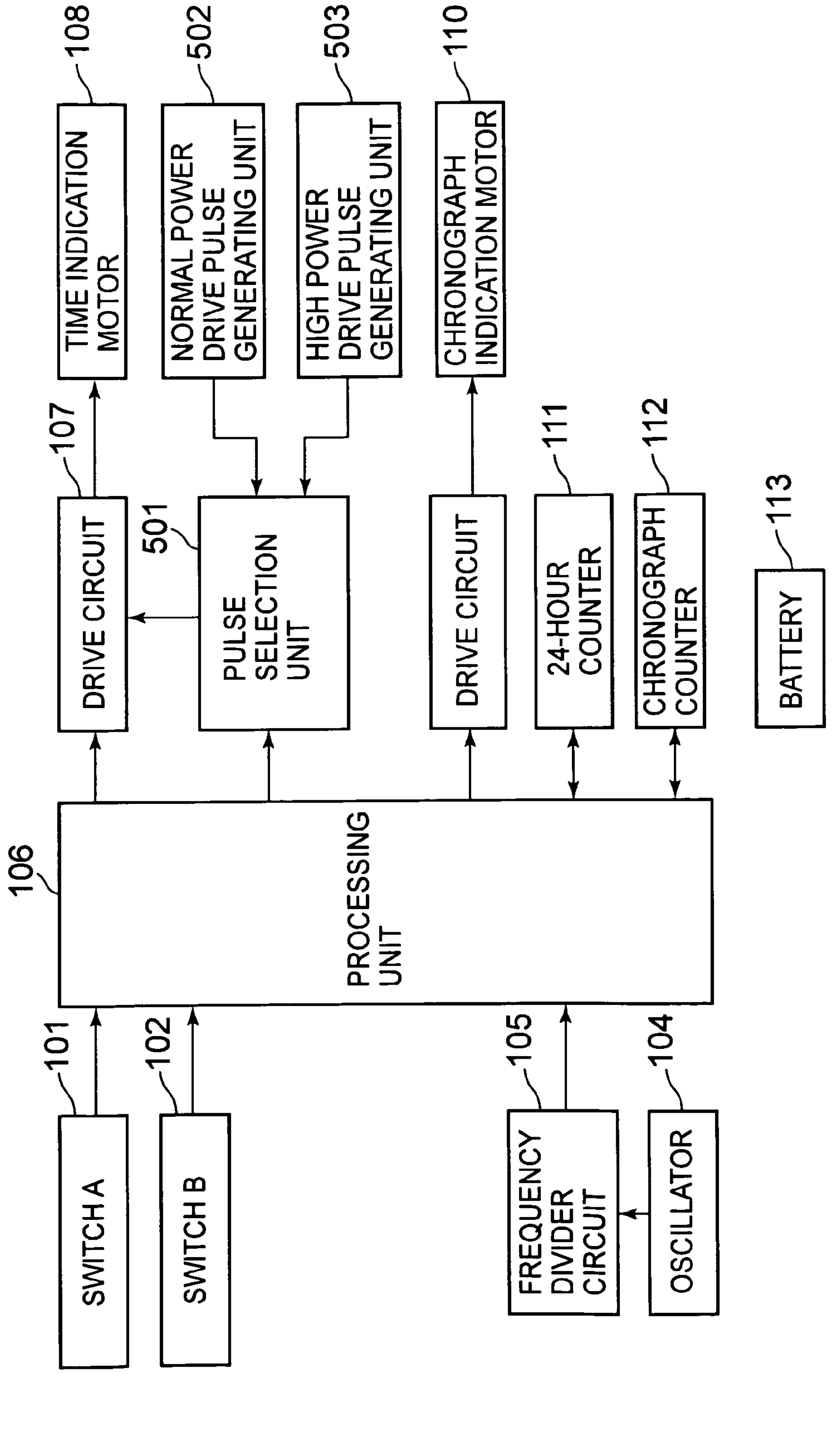
FIG. 5 is a block diagram showing a chronograph timepiece according to a second embodiment of the present invention.

FIG. 5 is a block diagram showing a chronograph timepiece according to the second embodiment of the present invention; the same portions as those of FIG. 1 are indicated by the same reference numerals. In FIG. 5, the processing unit 106, the 24-hour counter 111, the chronograph counter 112, a pulse selection unit 501, a normal power drive pulse generating unit 502, and a high power drive pulse generating unit 503 constitute a consumption control unit.

Figure 6:
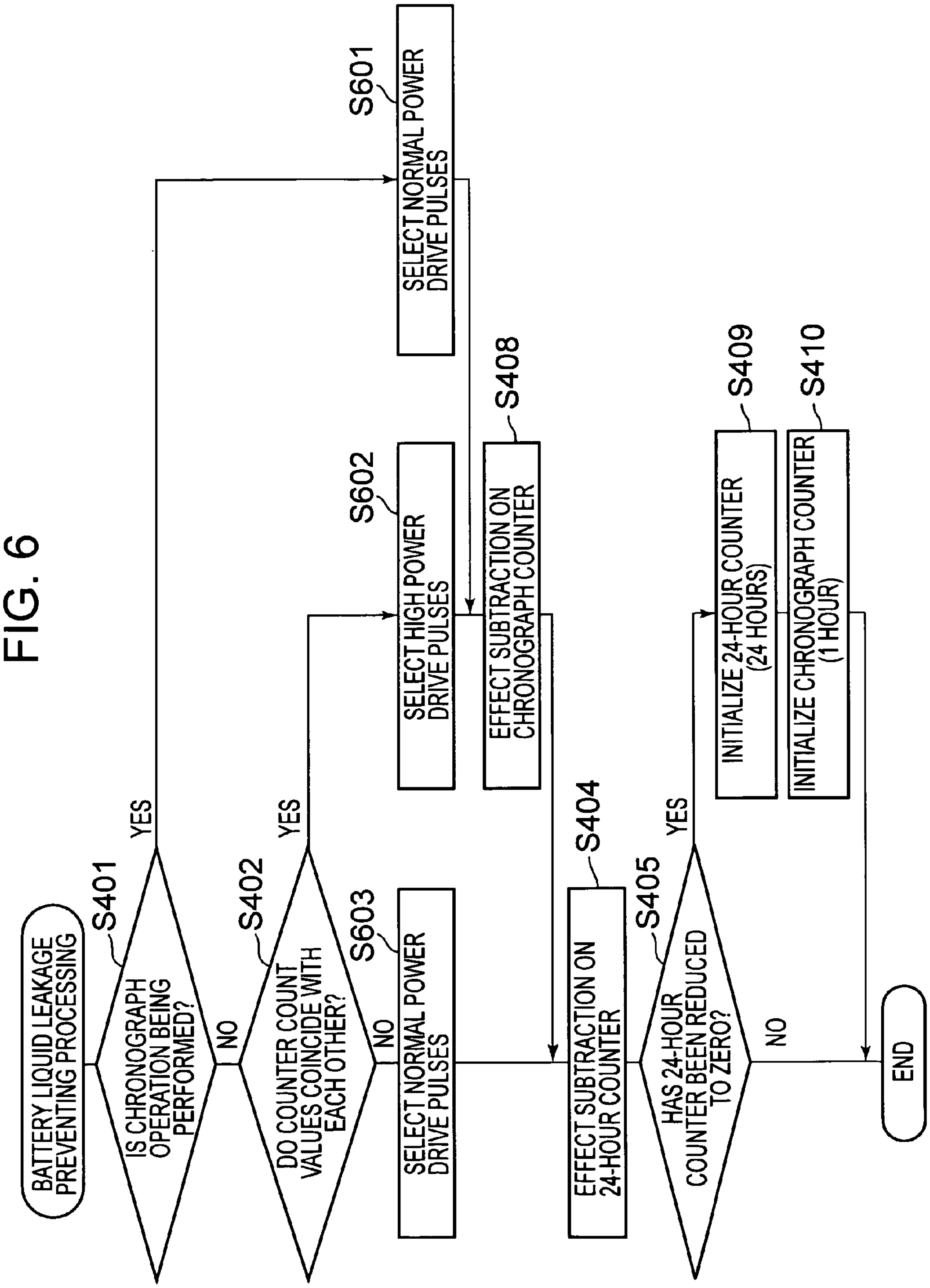
FIG. 6 is a flowchart for the chronograph timepiece of the second embodiment of the present invention.

FIG. 6 is a flowchart for the second embodiment of the present invention, showing the battery liquid leakage preventing processing in FIG. 3 (step S305); the same portions as those of FIG. 4 are indicated by the same reference numerals.

The difference between FIGS. 5 and 1 is as follows: in the example of FIG. 1, the battery power consuming unit 103 is provided as a dedicated component for consuming the battery 113, whereas, in the example of FIG. 5, there are provided, in order to consume the battery 113, the pulse selection unit 501, the normal power drive pulse generating unit 502 generating main drive pulses for rotating the time indication motor 108 during normal operation, and the high power drive pulse generating unit 503 generating sub drive pulses of larger power effective value than the main drive pulses. In the sub drive pulses, consumption power in an amount corresponding to one second of the chronograph operation is added to the main drive pulses.

As will be described in detail below, during normal drive of the time indication motor 108, the pulse selection unit 501 selects the normal power drive pulse generating unit 502, and driving is effected with the main drive pulses from the normal power drive pulse generating unit 502. When consuming the battery 113, the pulse selection unit 501 selects the high power drive pulse generating unit 503, and driving is effected with the sub drive pulses from the high power drive pulse generating unit 503, thereby performing battery power consuming operation by an amount corresponding to the difference in energy between the main drive pulses and the sub drive pulses.

In the following, the difference of the operation of the second embodiment from that of the first embodiment will be described with reference to FIGS. 3, 5, and 6.

When it is judged in step S401 of FIG. 6 that chronograph measurement operation is being conducted, the processing unit 106 effects control such that the pulse selection unit 501 selects the normal power drive pulse generating unit 502 (step S601), and the procedure advances to step S408. As a result, the drive circuit 107 rotates the time indication motor 108 with the main drive pulses from the normal power drive pulse generating unit 502, so that no excessive consumption of the battery 113 is effected, and normal time hand movement drive operation is conducted.

When it is judged in step S402 that the count value of the 24-hour counter 111 and that of the chronograph counter 112 are equal to each other, the processing unit 106 effects control such that the pulse selection unit 501 selects the high power drive pulse generating unit 503 (step S602), and then the procedure advances to step S408. As a result, the drive circuit 107 rotates the time indication motor 108 with the sub drive pulses from the high power drive pulse generating unit 503, and battery consuming operation is effected by an amount corresponding to the difference in energy between the sub drive pulses and the main drive pulses each time the time indication motor 108 is driven.

When it is judged in step S402 that the count value of the 24-hour counter 111 and that of the chronograph counter 112 are not equal to each other, the processing unit 106 effects control such that the pulse selection unit 501 selects the normal power drive pulse generating unit 502 (step S603), and the procedure advances to step S404. As a result, the drive circuit 107 rotates the time indication motor 108 with the main drive pulses from the normal power drive pulse generating unit 502, and normal time hand movement drive operation is performed without effecting any excessive consumption of the battery 113.

As in the first embodiment, in the second embodiment also, there is provided a consumption control unit which calculates a use-shortage period of the chronograph unit during a predetermined period of time and which consumes the battery 113 by an amount corresponding to the use-shortage period, so that even when the period of time that the chronograph function is used is short, it is possible to prevent the battery reliability service life time from being exceeded, making it possible to prevent failure generation in the chronograph timepiece due to liquid leakage.

The present invention is applicable to a chronograph timepiece using a battery as the power source.

What is claimed is:

1. A chronograph timepiece comprising:

a timekeeping unit for timekeeping and time display;

a chronograph unit for effecting time measurement and measurement result display;

a battery serving as a drive power source; and a consumption control unit for calculating a use-shortage period of the chronograph unit during a predetermined period of time and consuming the battery by an amount corresponding to the use-shortage period.

2. A chronograph timepiece according to claim 1; wherein the consumption control unit has a use-shortage period calculating unit for calculating a use-shortage period of the chronograph unit during a predetermined period of time, with consumption being effected by an amount corresponding to the use-shortage period as calculated by the use-shortage period calculating unit.

3. A chronograph timepiece according to claim 2; wherein the use-shortage period calculating unit has a first down counter unit for measuring the predetermined period of time and a second down counter unit for measuring the use-shortage period; and the consumption control unit effects control such that consumption is effected when count values of the first and second counter unit become equal to each other.

4. A chronograph timepiece according to claim 1; wherein, when the chronograph unit operates while the battery is being consumed, the consumption control unit interrupts the consuming operation.

5. A chronograph timepiece according to claim 2; wherein, when the chronograph unit operates while the battery is being consumed, the consumption control unit interrupts the consuming operation.

6. A chronograph timepiece according to claim 3; wherein, when the chronograph unit operates while the battery is being consumed, the consumption control unit interrupts the consuming operation.

7. A chronograph timepiece according to claim 1; wherein the consumption control unit has a battery power consuming unit for consuming the battery and that effects control so as to effect consumption by an amount corresponding to the use-shortage period by the battery power consuming unit.

8. A chronograph timepiece according to claim 2; wherein the consumption control unit has a battery power consuming unit for consuming the battery and that effects control so as to effect consumption by an amount corresponding to the use-shortage period by the battery power consuming unit.

9. A chronograph timepiece according to claim 3; wherein the consumption control unit has a battery power consuming unit for consuming the battery and that effects control so as to effect consumption by an amount corresponding to the use-shortage period by the battery power consuming unit.

10. A chronograph timepiece according to claim 4; wherein the consumption control unit has a battery power consuming unit for consuming the battery and that effects control so as to effect consumption by an amount corresponding to the use-shortage period by the battery power consuming unit.

11. A chronograph timepiece according to claim 5; wherein the consumption control unit has a battery power consuming unit for consuming the battery and that effects control so as to effect consumption by an amount corresponding to the use-shortage period by the battery power consuming unit.

12. A chronograph timepiece according to claim 6; wherein the consumption control unit has a battery power consuming unit for consuming the battery and that effects control so as to effect consumption by an amount corresponding to the use-shortage period by the battery power consuming unit.

13. A chronograph timepiece according to claim 1; wherein the timekeeping unit has a motor for driving a time hand for indicating time, and a motor drive unit for driving the motor in correspondence with the time obtained through timekeeping; and the consumption control unit normally controls the motor drive unit so as to drive the motor with a main drive pulse, and effects consumption by an amount corresponding to the use-shortage period by effecting control such that the motor drive unit drives the motor with a sub drive pulse of larger power effective value than the main drive pulse.

14. A chronograph timepiece according to claim 2; wherein the timekeeping unit has a motor for driving a time hand for indicating time, and a motor drive unit for driving the motor in correspondence with the time obtained through timekeeping; and the consumption control unit normally controls the motor drive unit so as to drive the motor with a main drive pulse, and effects consumption by an amount corresponding to the use-shortage period by effecting control such that the motor drive unit drives the motor with a sub drive pulse of larger power effective value than the main drive pulse.

15. A chronograph timepiece according to claim 3; wherein the timekeeping unit has a motor for driving a time hand for indicating time, and a motor drive unit for driving the motor in correspondence with the time obtained through timekeeping; and the consumption control unit normally controls the motor drive unit so as to drive the motor with a main drive pulse, and effects consumption by an amount corresponding to the use-shortage period by effecting control such that the motor drive unit drives the motor with a sub drive pulse of larger power effective value than the main drive pulse.

16. A chronograph timepiece according to claim 4; wherein the timekeeping unit has a motor for driving a time hand for indicating time, and a motor drive unit for driving the motor in correspondence with the time obtained through timekeeping; and the consumption control unit normally controls the motor drive unit so as to drive the motor with a main drive pulse, and effects consumption by an amount corresponding to the use-shortage period by effecting control such that the motor drive unit drives the motor with a sub drive pulse of larger power effective value than the main drive pulse.

17. A chronograph timepiece according to claim 5; wherein the timekeeping unit has a motor for driving a time hand for indicating time, and a motor drive unit for driving the motor in correspondence with the time obtained through timekeeping; and the consumption control unit normally controls the motor drive unit so as to drive the motor with a main drive pulse, and effects consumption by an amount corresponding to the use-shortage period by effecting control such that the motor drive unit drives the motor with a sub drive pulse of larger power effective value than the main drive pulse.

18. A chronograph timepiece according to claim 6; wherein the timekeeping unit has a motor for driving a time hand for indicating time, and a motor drive unit for driving the motor in correspondence with the time obtained through timekeeping; and the consumption control unit normally controls the motor drive unit so as to drive the motor with a main drive pulse, and effects consumption by an amount corresponding to the use-shortage period by effecting control such that the motor drive unit drives the motor with a sub drive pulse of larger power effective value than the main drive pulse.

19. A chronograph timepiece according to claim 1; wherein the consumption control unit controls a motor drive unit such that a motor is driven with a main drive pulse when the count value of a first down counter unit is larger than the count value of a second down counter unit, and such that the motor is driven with a sub drive pulse of larger power effective value than the main drive pulse when the count values of the first and second down counter unit are equal to each other.

20. A chronograph timepiece according to claim 2; wherein the consumption control unit controls a motor drive unit such that a motor is driven with a main drive pulse when the count value of a first down counter unit is larger than the count value of a second down counter unit, and such that the motor is driven with a sub drive pulse of larger power effective value than the main drive pulse when the count values of the first and second down counter unit are equal to each other.

* * * * *